United States Patent
Baucke et al.

(10) Patent No.: US 6,629,437 B1
(45) Date of Patent: Oct. 7, 2003

(54) METHOD OF IMPROVING THE QUALITY OF GLASS

(75) Inventors: Friedrich Baucke, Mainz (DE); Johann Weber, Wiesbaden (DE); Thomas Pfeiffer, Ingelheim (DE); Gernot Röth, Dalheim (DE)

(73) Assignee: Schott Glas, Mainz (DE)

( * ) Notice: Subject to any disclaimer, the term of this patent is extended or adjusted under 35 U.S.C. 154(b) by 312 days.

(21) Appl. No.: 09/715,134

(22) Filed: Nov. 20, 2000

(30) Foreign Application Priority Data

Nov. 20, 1999 (DE) .......................... 199 55 827

(51) Int. Cl.$^7$ ................................ C03B 5/42
(52) U.S. Cl. .................... 65/134.9; 65/135.1; 65/135.7; 65/135.8
(58) Field of Search ............................ 65/134.9, 135.1, 65/135.7, 136.8

(56) References Cited

U.S. PATENT DOCUMENTS

| | | | | |
|---|---|---|---|---|
| 2,122,469 A | * | 7/1938 | Hitner | 373/33 |
| 2,159,361 A | * | 5/1939 | Atkinson et al. | 373/34 |
| 2,561,818 A | | 7/1951 | Peyches | |
| 2,686,820 A | * | 8/1954 | Arbeit et al. | 65/135.7 |
| 3,206,295 A | | 9/1965 | Mattern | |
| 3,242,060 A | * | 3/1966 | Le Clerc | 205/766 |
| 3,527,590 A | * | 9/1970 | Goto et al. | 65/337 |
| 4,323,383 A | * | 4/1982 | Sims | 65/29.21 |
| 4,557,743 A | * | 12/1985 | Claes et al. | 65/29.12 |
| 4,603,980 A | | 8/1986 | Berg | 374/179 |
| 5,509,951 A | * | 4/1996 | Baucke et al. | 65/134.6 |
| 5,749,932 A | * | 5/1998 | Lamar et al. | 65/135.7 |
| 5,785,726 A | * | 7/1998 | Dorfeld et al. | 65/134.1 |
| 5,964,913 A | * | 10/1999 | Titov et al. | 65/135.6 |

FOREIGN PATENT DOCUMENTS

| | | |
|---|---|---|
| DE | DD 4324922 | 2/1995 |
| FR | 994796 | 11/1951 |
| GB | 201 297 | 7/1983 |

* cited by examiner

Primary Examiner—Sean Vincent
(74) Attorney, Agent, or Firm—Walter Ottesen

(57) ABSTRACT

The invention relates to a method for suppressing the formation of oxygen gas bubbles at the contact interface between a glass melt and a component of a glass melting arrangement with this component being made of a precious metal. This component is especially the precious metal lining of a feed channel. The characterization "precious metal" includes in this context: platinum, gold, rhenium, all other metals of the platinum group, the alloys of the above-mentioned metals and the above-mentioned metals and alloys in dispersion oxide enhanced form. The occurrence of gas bubbles at the phase boundary between precious metal and the glass melt has been known for some time without effective measures having been suggested up until now to improve significantly the quality and yield of the generated glass products, particularly because precious metal parts have to be arranged in the glass manufacture downstream of the usual purification devices with which gas bubbles can be removed from the melt. To solve the task resulting therefrom, it is provided in accordance with the invention that the part, which is made of precious metal, is electrically conductively connected to one or several electrodes which are arranged spaced from the part, which is made of precious metal, in the glass melt, and that a potential drop is generated between the electrode and the part made of precious metal so that a current flows.

26 Claims, 4 Drawing Sheets

METHOD OF IMPROVING THE QUALITY OF GLASS

FIELD OF THE INVENTION

The invention relates to a method for suppressing the formation of oxygen gas bubbles at the contact interface between a glass melt and a component of a glass melting apparatus with the component consisting of a precious metal. The component is especially the precious metal lining of a feed channel. The characterization "precious metal" includes in this context: platinum, gold, rhenium, all other metals of the platinum group, the alloys of the above-mentioned metals and the above-mentioned metals and alloys in a dispersion oxide enhanced form.

BACKGROUND OF THE INVENTION

Glass melts always contain a certain water portion which splits into a more or less large percentage of hydrogen and oxygen at the usual glass melt temperatures. The precious metal, which is used for the lining of parts of a glass melt apparatus, is permeable for hydrogen. For this reason, the migration of hydrogen at the phase boundary between the precious metal and the glass melt leads to an enrichment of oxygen which is taken up in the glass melt in the form of small bubbles whereby the quality of the generated glass products can be significantly affected. The occurrence of gas bubbles at the phase boundary between the precious metal and the glass melt has been known for a long time without effective measures being suggested until now in order to significantly improve quality and yield of the generated glass products. This is so especially because precious metal parts must be mounted downstream of the usual purification devices with which glass bubbles can be removed from the melt.

The oxygen partial pressure of a glass melt can, for example, be measured via electrodes dipped into the melt, for example, as in accordance with German patent publication 4,324,922. The electrodes are connected to each other via a voltage measuring apparatus. As explained in U.S. Pat. No. 4,603,980, the temperature and the electric resistance of a glass melt can also be measured in that high frequency alternating currents are applied. With both measuring methods, one should note that no current can flow in the glass melt during the measurement in order not to change the characteristics of the glass melt by the measurement.

In German patent publication DD-PS 201,297, an arrangement for electrically melting glass is disclosed. A high frequency alternating voltage is applied for heating the trough. The sequence of the purification is influenced by blowing gaseous oxygen directly into the melt with the aid of nozzles.

SUMMARY OF THE INVENTION

It is an object of the invention to suppress the formation of oxygen gas bubbles at the contact interface between a glass melt and a component of a glass melt apparatus made of precious metal, especially of the precious metal lining of a feed channel.

Surprisingly, it has been shown that this object can be achieved when one electrically connects the part made of precious metal to an electrode (or several electrodes) which is arranged in the glass melt in spaced relationship to the part made of precious metal and when one generates a potential drop between the electrode and the precious metal part in such a manner that a current flows. If an adequately large electrical negative potential difference referred to the glass melt is maintained at the component made of precious metal, then the oxygen is ionized which remains after migration of the hydrogen through the precious metal wall, that is, the oxygen is converted into negatively charged $O^{2-}$ ions which (other than neutral oxygen molecules) dissolve in the melt in an unlimited quantity and do not bunch to form gas bubbles.

Extensive experiments have shown that the component of oxygen bubbles in the finished glass product can be suppressed down to small non-damaging residual quantities with the measures provided by the invention and that quality and yield of glass production can be considerably increased.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
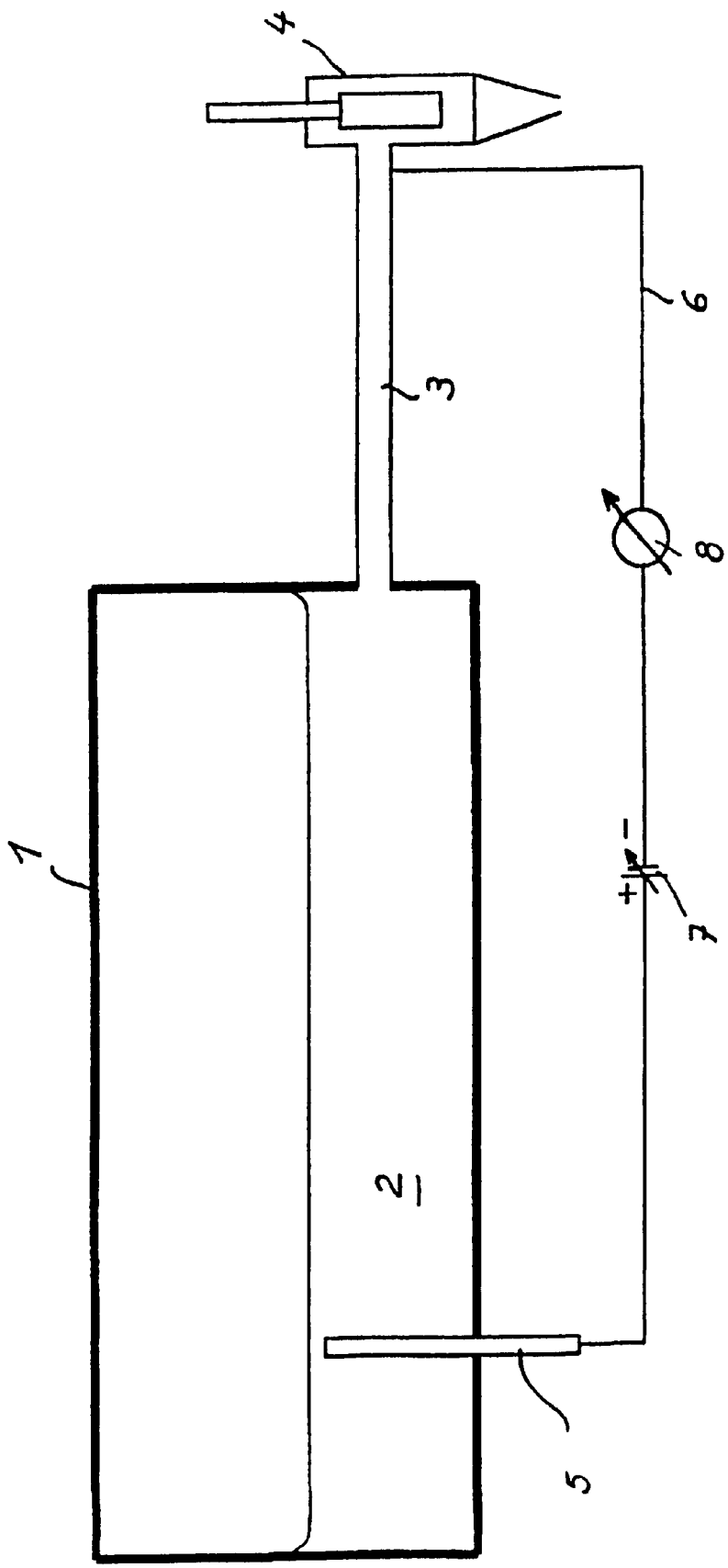
FIG. 1 is a schematic of an embodiment of the invention having a direct-voltage source.

In FIGS. 1 to 4, reference numeral 1 identifies a melt trough 1 containing a glass melt 2, reference numeral 3 identifies a feed channel and reference numeral 4 identifies a stirring crucible.

In the embodiment of FIG. 1, the precious metal lining of the feed channel 3 is electrically connected via a line 6 to one or several electrodes 5 arranged in the glass melt 2. A controllable direct voltage source 7 as well as current measuring apparatus 8 are mounted in the line 6. In this way, a negative electrical potential is generated in accordance with the invention on the platinum lining of the feed channel 3. With this potential, the formation of oxygen bubbles can be effectively suppressed because the oxygen, which remains because of the migration of hydrogen through the precious metal lining, is ionized and does not bunch to form gas bubbles. The electrically positive counter potential is generated at the electrode 5, which is made of precious metal, so that here electrically negative charged oxygen ions are electrically neutralized, bunch to gas bubbles and can exit upwardly from the glass melt in the gravitational field. By withdrawing the glass melt 2 below the bath surface, the situation is averted that gas bubbles or foam gets into the glass product. The current flow is measured and is adjusted to a value, which is optimal for impeding the formation of oxygen gas bubbles, by the operating personnel of the melting trough or an automatic control device.

Figure 2:
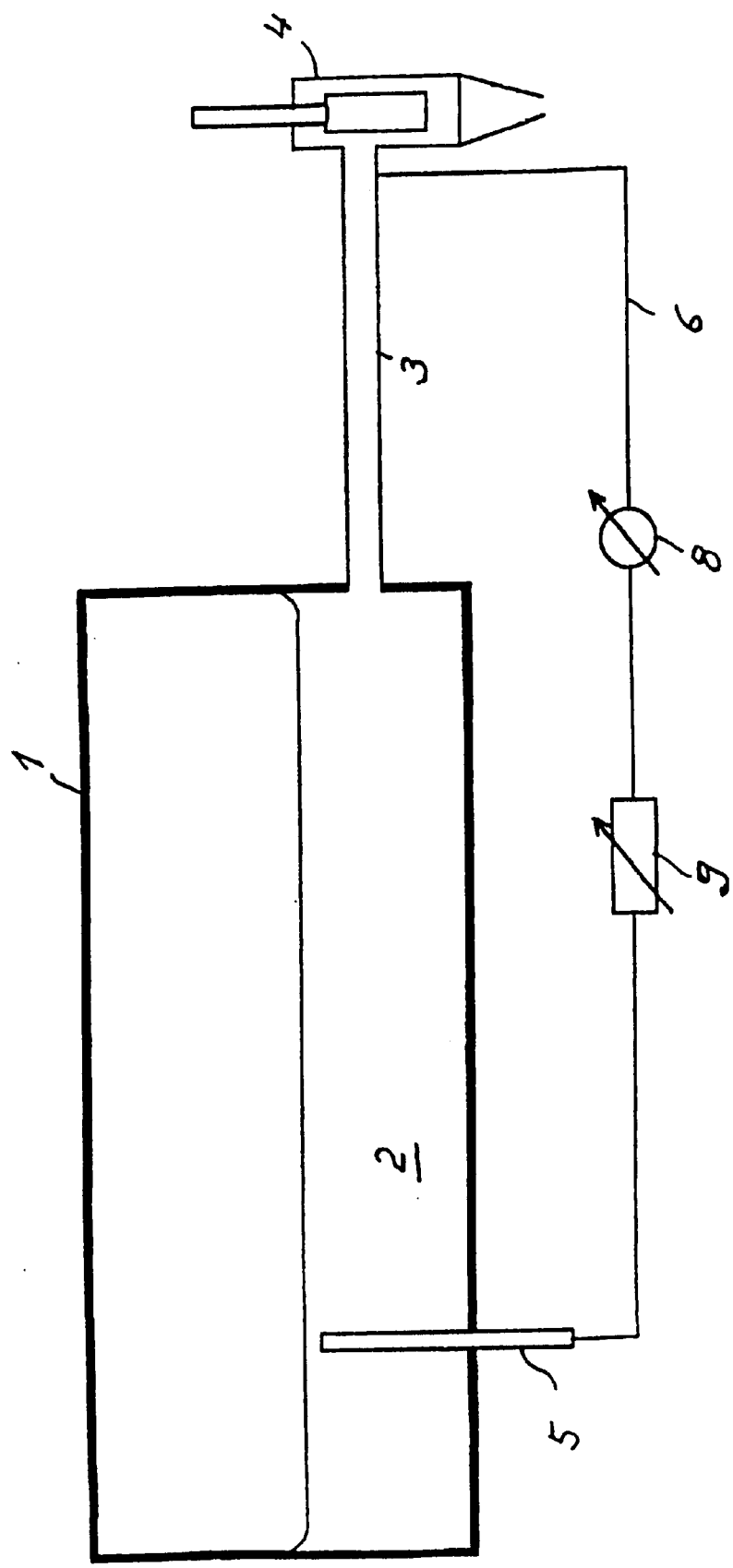
FIG. 2 is a schematic of an embodiment of the invention with a control resistor.

In the embodiment of FIG. 2, the electrode 5 is made of a refractory metal such as molybdenum. A current measuring device 8 and a controllable resistor 9 are mounted in the connecting line 6 between the platinum lining of the feed channel 3 and the electrode 5. The electrode, which is made of molybdenum, slowly dissolves in the glass melt 2 in that it releases positively charged metal ions into the melt. The electrons, which remain, charge the electrode negatively until a sufficient potential drop occurs to the precious metal lining in the feed channel 3. The electrons are moved to the precious metal lining of the feed channel 3 via the connecting line 6, the current measuring device 8 and the controllable resistor 9. At the precious metal lining, the electrons ionize the oxygen which remains after the migration of the hydrogen through the precious metal lining and in this way suppress the development of gas bubbles. The potential drop generated in this manner can amount to some hundred millivolts and is preferably monitored and controlled to the value required for the suppression of the formation of oxygen gas bubbles.

Figure 3:
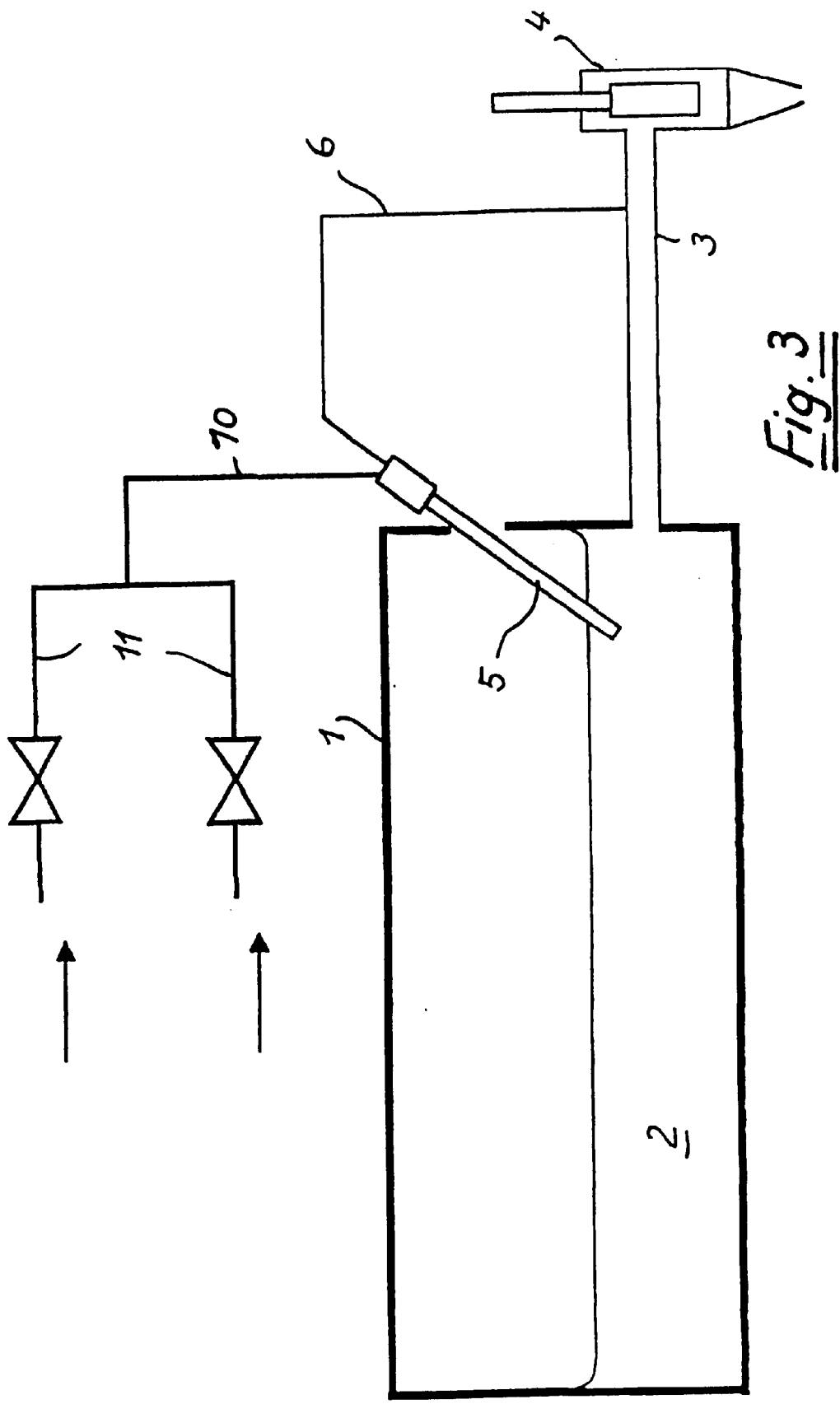
FIG. 3 is a schematic of an embodiment of the invention with a scavenging gas operation; and, FIG. 4 is a variation of the embodiment of FIG. 1 with a device for the automatic control of the direct voltage source.

In the embodiment of FIG. 3, one or several electrodes made of yttrium stabilized, calcium stabilized or magnesium stabilized zirconium oxide ceramic are used. These electrodes are tubular shaped and closed at their ends and a precious metal wire is so arranged in the hollow space thereof that it is in electrically conductive contact to the zirconium oxide ceramic wall at the tip of the electrode over a distance of approximately 2 to 10 cm. Above this region, the wire is electrically insulated with a material resistant to fire. The wire is led to the outside at the head of the electrode by means of a gas-tight, electrically insulating passthrough. The wire is electrically conductively connected via the connecting line 6 to the precious metal lining of the feed channel 3.

Furthermore, the interior of the electrode 5 is connected to a scavenging gas line 10 which is charged via a gas-mixing device 11 with a gas mixture, for example, a mixture of forming gas and nitrogen. Yttrium, calcium and magnesium stabilized zirconium oxide ceramic is permeable for oxygen ions above 600° C., that is, also at the temperatures of the glass melt so that oxygen can be conducted away from the glass melt via the wall of the electrode 5 when a very low oxygen partial pressure is maintained within the electrode by means of a supply of scavenging gas. The oxygen partial pressure in the interior of the electrode 5 can be adjusted within wide limits by changing the composition and/or the throughflow quantity of the scavenging gas. In this way, an electrical potential drop can be generated between the zirconium electrode and the precious metal lining of the feed channel. This potential drop, in magnitude, sign and effect corresponds to what would be generated by a direct voltage source or with the aid of the galvanic element of platinum/glass melt/molybdenum. The advantage of this arrangement is that no bubbles are generated by the zirconium electrode during operation and, in contrast to the molybdenum electrode, also no metal ions pass into the glass.

Figure 4:
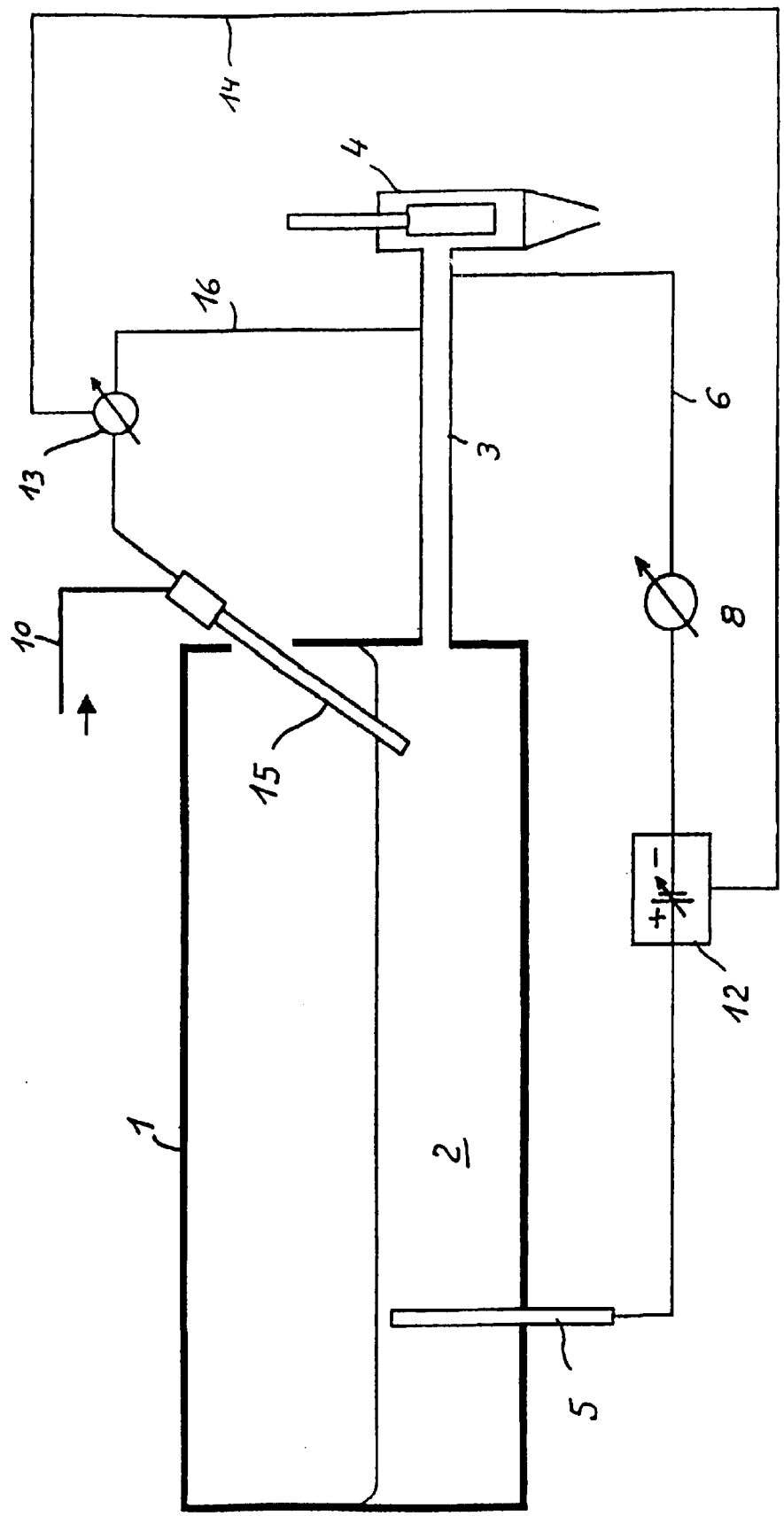

In the embodiment of FIG. 4, an arrangement according to FIG. 1 is provided with an automatic control whose possibilities were already mentioned with respect to the description of FIG. 1. The electrode 5, the connecting line 6, the current measuring device 8 and the controllable direct voltage source 12 correspond to the embodiment of FIG. 1.

The electrode 15 is of the same type as in FIG. 3. However, the electrode is scavenged with a gas of constant oxygen content and measures the oxygen content of the glass melt in the feed channel lined with a precious metal. For this purpose, the electrode is connected via a measuring device 13 and the line 16 to the precious metal of the feed channel. In lieu of the zirconium oxide ceramic electrode, a massive rod of refractory metal such as molybdenum, tungsten or tantalum, can be used as an electrode for measuring the oxygen content. The oxygen content of the melt, which is determined by the measuring device 13, is supplied via the line 14 to the controllable direct voltage source 12 which so controls the potential difference between electrode 5 and precious metal lining 3 that no oxygen bubbles form on the precious metal lining 3. The above-mentioned control device comprising electrode 15 and measuring device 13 can also be used for automating the arrangement of FIG. 2 when the output signal of the measuring device 13 is used to control the controllable resistor 9 of FIG. 2.

In the arrangement of FIG. 3, the hydrogen content of the scavenging gas of the electrode 5 is controlled with the aid of a gas mixture device by the output signal of the measuring device 13. In this case, one then needs at least two zirconium oxide ceramic electrodes. One or several electrode(s) according to FIG. 3 is needed for achieving a potential difference and the electrode 15 of FIG. 4 is needed to measure the oxygen content of the glass melt in the feed channel lined with precious metal. In lieu of the zirconium oxide ceramic electrode 15, a massive rod made of refractory metal can likewise be used.

All embodiments described herein were thoroughly tested and have yielded that they can be effectively utilized for the sought after suppression of the formation of oxygen gas bubbles.

It is understood that the foregoing description is that of the preferred embodiments of the invention and that various changes and modifications may be made thereto without departing from the spirit and scope of the invention as defined in the appended claims.

What is claimed is:

1. A method for suppressing the formation of oxygen gas bubbles at the contact interface between a glass melt and a component of a glass melting arrangement, the component of the glass melting arrangement being made of a precious metal, the method comprising the steps of:

providing at least one electrode and mounting said electrode in said melt in spaced relationship to said component;

electrically connecting said component to said electrode; and, generating a potential drop between said electrode and said component to cause a current to flow and maintaining an electrical negative potential difference referred to the glass melt at said component made of precious metal.

2. The method of claim 1, wherein said glass melting arrangement includes a feed channel having a lining and said component of precious metal is said lining of said feed channel.

3. The method of claim 1, wherein said precious metal is selected from the group consisting of platinum, gold, rhenium, the other metals of the platinum group, the alloys of the above-mentioned metals as well as dispersion oxide enhanced variations of the above-mentioned metals or their alloys are used.

4. The method of claim 1, wherein said electrode is mounted in a region of the glass melt wherein the formation of oxygen gas bubbles is non-damaging.

5. The method of claim 3, wherein said electrode is arranged in a region of the glass melt wherein the oxygen bubbles can be removed from the melt.

6. The method of claim 5, wherein said electrode is mounted in the melting region of the glass melt arrangement.

7. The method of claim 5, wherein said electrode is mounted in the purification chamber of the glass melt arrangement.

8. The method of claim 7, wherein a direct voltage source is provided; and, the potential drop is generated in that the part, which is made of precious metal, is connected to the negative pole and the electrode is connected to the positive pole of the direct voltage source.

9. The method of claim 8, wherein the potential drop is set to a specific value by means of a suitable controller.

10. The method of claim 7, wherein the potential drop is generated in that one or several electrode(s) is arranged in the glass melt with the electrode(s) releasing positively charged metal ions.

11. The method of claim 10, wherein one or several electrodes are used which are made entirely or partially of one or several refractory metals.

12. The method of claim 10, wherein the potential drop is set to a specific value by means of a control resistor.

13. The method of claim 7, wherein the potential drop is generated in that one or several electrodes are used which carry negatively charged $O^{2-}$ ions from the glass melt.

14. A method for suppressing the formation of oxygen gas bubbles at the contact interface between a glass melt and a component of a glass melting arrangement, the component of the glass melting arrangement being made of a precious metal, the method comprising the steps of:

providing at least one electrode and mounting said electrode in said melt in spaced relationship to said component;

electrically connecting said component to said electrode; and, generating a potential drop between said electrode and said component to cause a current to flow;

said precious metal is selected from the group consisting of platinum, gold, rhenium, the other metals of the platinum group, the alloys of the above-mentioned metals as well as dispersion oxide enhanced variations of the above-mentioned metals or their alloys are used;

said electrode is arranged in a region of the glass melt wherein the oxygen bubbles can be removed from the melt;

said electrode is mounted in the purification chamber of the glass melt arrangement;

said potential drop is generated in that one or several electrodes are used which carry negatively charged $O^{2-}$ ions from the glass melt; and, said electrodes comprise a tube of yttrium, calcium or magnesium stabilized zirconium oxide which is permeable for oxygen ions, the tube being closed at its end, a precious metal wire being electrically conductive connected to the inner wall of the tube and the other end being electrically conductive connected to the part of the glass melt arrangement made of precious metal.

15. The method of claim 14, wherein the potential drop is generated in that the platinum wire of said electrode is connected to the plus pole and the component, which is made of precious metal, is connected to the negative pole of a direct voltage source.

16. The method of claim 15, wherein the potential drop is set to a specific value by means of a suitable controller.

17. The method of claim 14, wherein the potential drop is generated in that the oxygen, which enters into the interior space of the electrode, is conveyed away by means of scavenging gas.

18. The method of claim 17, wherein the oxygen partial pressure in the interior of the electrode is controlled via a change of the composition or the throughflow quantity of the scavenging gas.

19. The method of claim 18, wherein said glass melting arrangement includes a feed channel having a lining and said component of precious metal is said lining of said feed channel; and, the command variable for the control of the oxygen partial pressure is obtained by the measurement of the electric voltage between an electrode of zirconium oxide ceramic and the precious metal of the feed channel.

20. The method of claim 19, wherein the zirconium oxide ceramic electrode is scavenged with a reference gas of known oxygen content.

21. The method of claim 17, wherein said glass melting arrangement includes a feed channel having a lining and said component of precious metal is said lining of said feed channel; the oxygen content of the scavenging gas is controlled with a command variable; and, the command variable for the control of the oxygen content of the scavenging gas is obtained by the measurement of the electric voltage between a zirconium oxide ceramic electrode and the precious metal of the feed channel.

22. The method of claim 11, wherein said glass melting arrangement includes a feed channel having a lining and said component of precious metal is said lining of said feed channel; a resistor is provided in the connecting line between the electrode of refractory metal in the trough and the precious metal of the feed channel; and, the command variable for the control of the resistor in the connecting line between the electrode of refractory metal in the trough and the precious metal lining of the feed channel is obtained by the measurement of the electric voltage between a zirconium oxide ceramic electrode and the precious metal of the feed channel.

23. The method of claim 9, wherein said glass melting arrangement includes a feed channel having a lining and said component of precious metal is said lining of said feed channel; and, the command variable for the adjustment of the direct voltage source is obtained by the measurement of the electric voltage between a zirconium oxide ceramic electrode and the precious metal of the feed channel.

24. The method of claim 9, wherein said glass melting arrangement includes a feed channel having a lining and said component of precious metal is said lining of said feed channel; and, the command variable for the adjustment of the direct voltage source is obtained by the measurement of the electric voltage between an electrode of refractory metal and the precious metal of the feed channel.

25. The method of claim 17, wherein said glass melting arrangement includes a feed channel having a lining and said component of precious metal is said lining of said feed channel; one or several electrodes are used which are made entirely or partially of one or several refractory metals; and, the command variable for the control of the oxygen content of the scavenging gas is obtained by the measurement of the electric voltage between the electrode of refractory metal and the precious metal of the feed channel.

26. The method of claim 11, wherein said glass melting arrangement includes a feed channel having a lining and said component of precious metal is said lining of said feed channel; one or several electrodes are used which are made entirely or partially of one or several refractory metals; and, the command variable for the control of the resistor in the connecting line between the electrode of refractory metal in the trough and the precious metal lining of the feed channel is obtained by the measurement of the electric voltage between a further electrode of refractory metal and the precious metal of the feed channel.

* * * * *